United States Patent
LaPlaca (10) Patent No.: US 7,439,732 B2
(45) Date of Patent: Oct. 21, 2008

(54) ROTARY POSITION SENSOR

(75) Inventor: Matthew LaPlaca, Franklin, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 11/235,677

(22) Filed: Sep. 26, 2005

(65) Prior Publication Data

US 2006/0176050 A1 Aug. 10, 2006

Related U.S. Application Data

(60) Provisional application No. 60/612,743, filed on Sep. 24, 2004.

(51) Int. Cl.
*G01B 7/30* (2006.01)
*G01R 33/07* (2006.01)

(52) U.S. Cl. .............................. 324/207.25; 324/207.2

(58) Field of Classification Search ............. 324/207.2, 324/207.21, 207.25, 251, 252; 73/313; 200/11 R, 200/11 TW, 43.08, 564, 567, 570, 336, 50.34
See application file for complete search history.

(56) References Cited

U.S. PATENT DOCUMENTS

| 5,497,081 | A | * | 3/1996 | Wolf et al. ............. 324/207.12 |
| 5,592,079 | A | * | 1/1997 | Scheel .................... 324/207.25 |
| 6,188,332 | B1 | * | 2/2001 | Scarlata ........................ 341/35 |
| 2003/0080732 | A1 | * | 5/2003 | Okazaki et al. .......... 324/207.2 |
| 2004/0003660 | A1 | * | 1/2004 | Fukuhara et al. .............. 73/319 |

* cited by examiner

*Primary Examiner*—Kenneth J Whittington
(74) *Attorney, Agent, or Firm*—Grossman, Tucker, Perreault & Pfleger, PLLC (57) ABSTRACT

A rotary magnetic position sensor including a housing, a sensor coupled to the housing, a rotor rotatably mounted to the housing, and a magnet coupled to the rotor and positioned adjacent the sensor. The sensor may be configured to provide a sensor output in response to a rotational position of the rotor relative to the housing.

3 Claims, 9 Drawing Sheets

ROTARY POSITION SENSOR

CROSS-REFERENCE TO RELATED APPLICATIONS

The present application claims the benefit of U.S. Provisional Application Ser. No. 60/612,743, filed on Sep. 24, 2004, the entire disclosure of which is incorporated herein by reference.

FIELD OF THE INVENTION

The present disclosure relates in general to sensors, and, more particularly, to a sensor for sensing the position of an accelerator pedal or throttle body sensor position in a vehicle.

BACKGROUND OF THE INVENTION

Rotary Position sensors are uses in vehicle systems for a variety of purposes, e.g. for sensing the position of accelerator pedals, clutch pedals, brake pedals, throttle body, and other components. In some known configurations a flux concentrator and/or formed magnets are used to direct magnetic flux to one or more Hall Effect sensors. There is a need for a sensor configuration that provides reliable position sensing in a simple and cost efficient package.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

For ease of explanation, the sensor systems consistent with the invention may be described herein in connection with automotive systems. It will be recognized, however, a sensor consistent with the invention will be useful in connection with a wide variety of system types. In addition, the exemplary embodiments described herein include the use of Hall Effect sensors and a magnet. Those skilled in the art will recognize, however, that a variety of sensing means may be used. For example, optical, magneto-resistive, fluxgate sensors, etc. may be useful in connection with a sensor system consistent with the invention. In alternative embodiments sensor control elements other than magnets or shunts, e.g. an optical source, may be used. It is to be understood, therefore, that illustrated exemplary embodiments described herein are provided only by way of illustration, and are not intended to be limiting.

Figure 1:
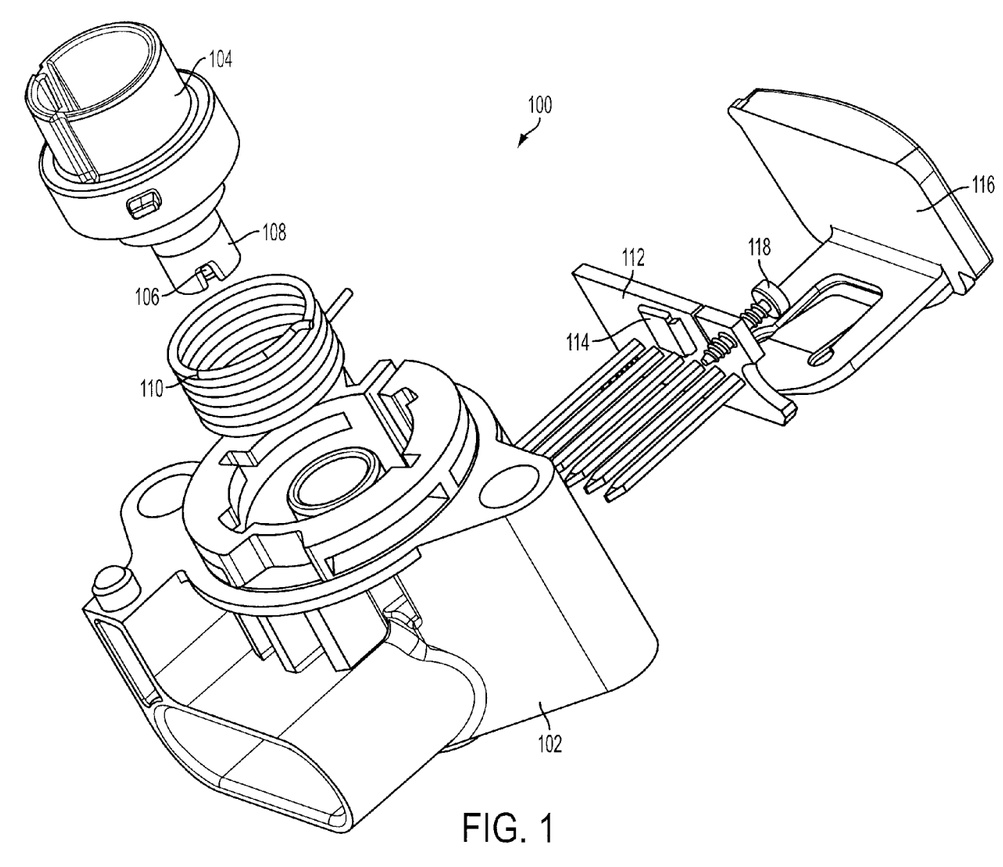
FIG. 1 is an exploded perspective of an exemplary rotary position sensor consistent with the present invention.
Figure 2:
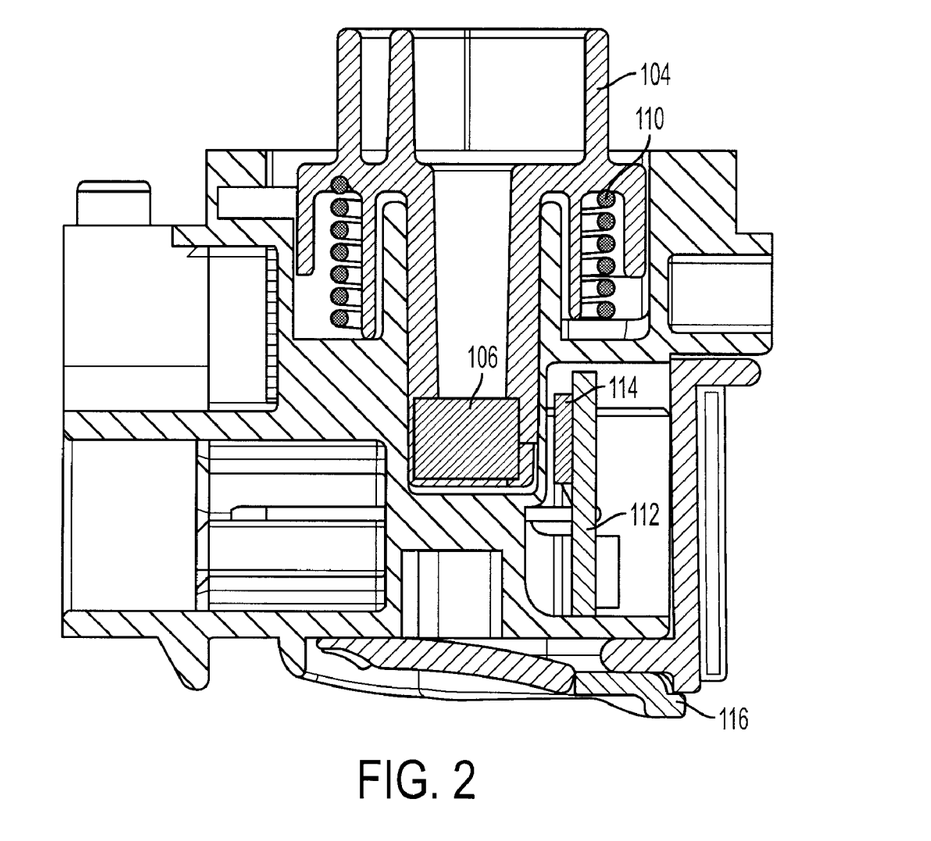
FIG. 2 is a sectional view of the exemplary sensor shown in FIG. 1
Figure 3A:
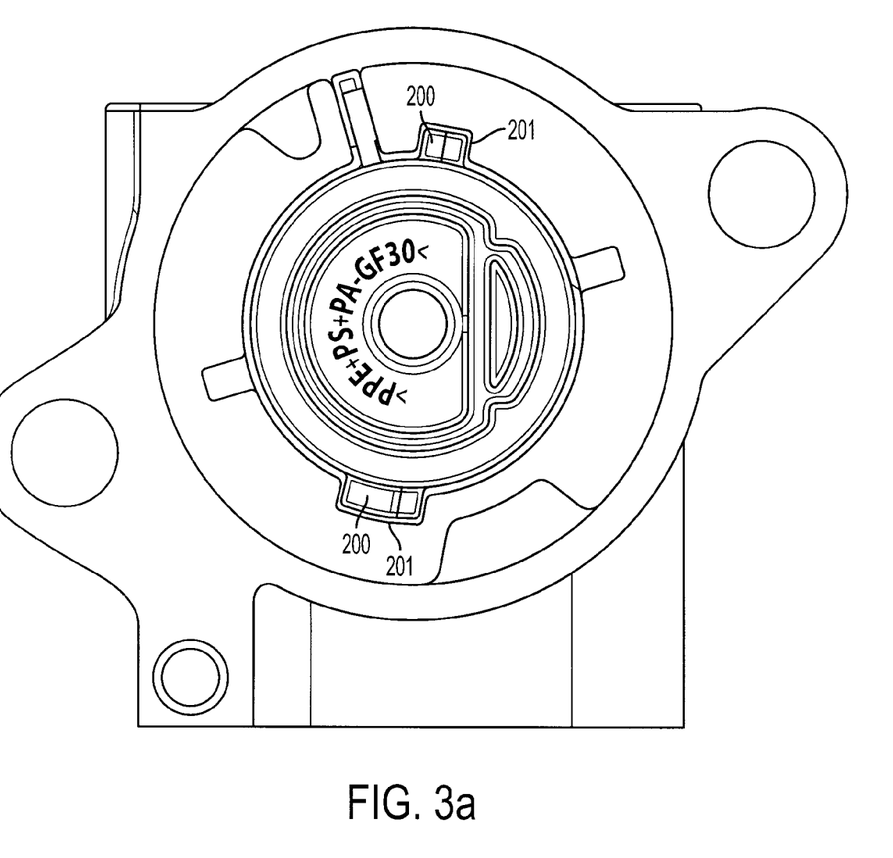
FIG. 3a is a top view of the sensor shown in FIG. 1 showing rotor ears lined up for initial assembly.
Figure 3B:
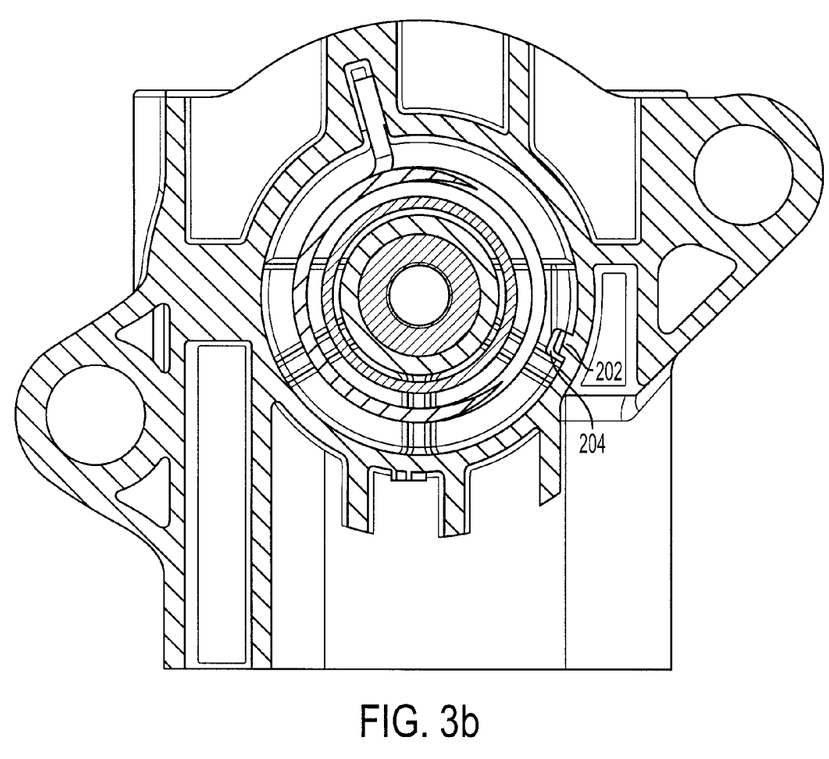
FIG. 3b is a sectional view of the assembly illustrated in FIG. 3a showing the rotor pushed down and a rotor tooth pushed inward by the housing stop.
Figure 3C:
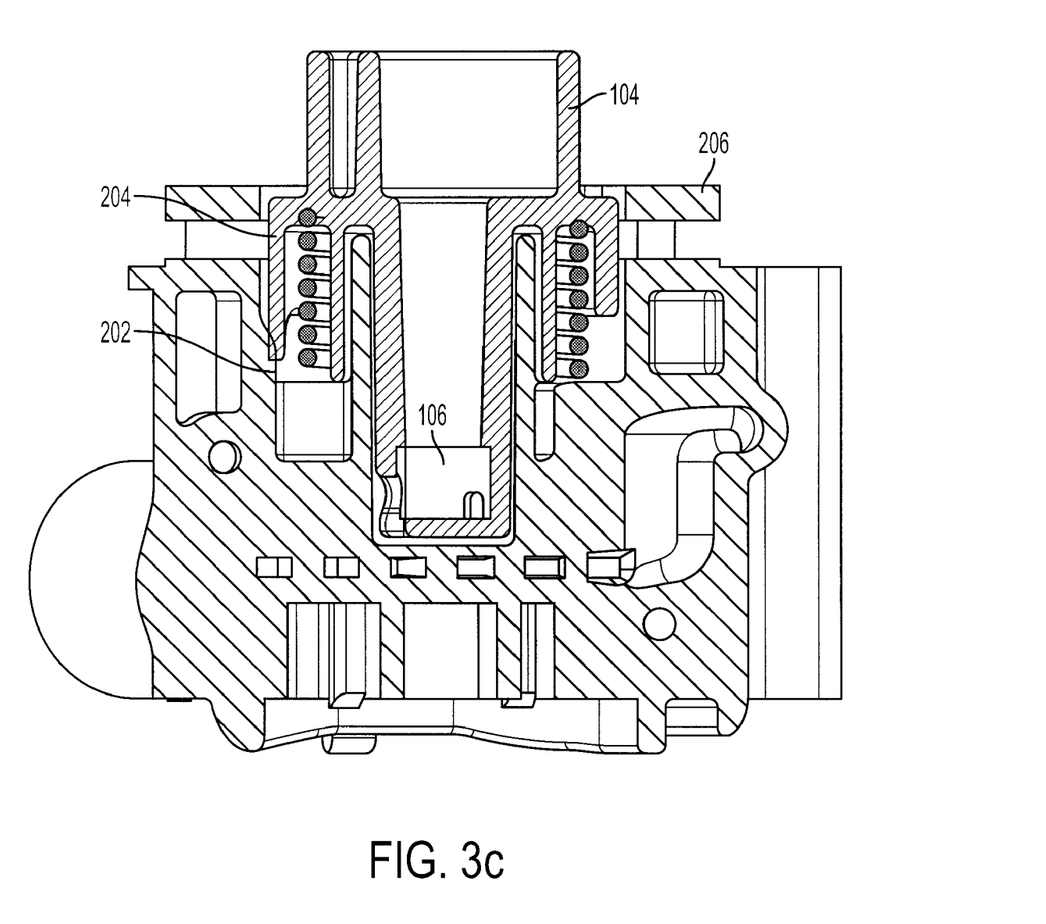
FIG. 3c is a sectional view of the assembly illustrated in FIG. 3a show housing stop and rotor tooth interference.
Figure 4A:
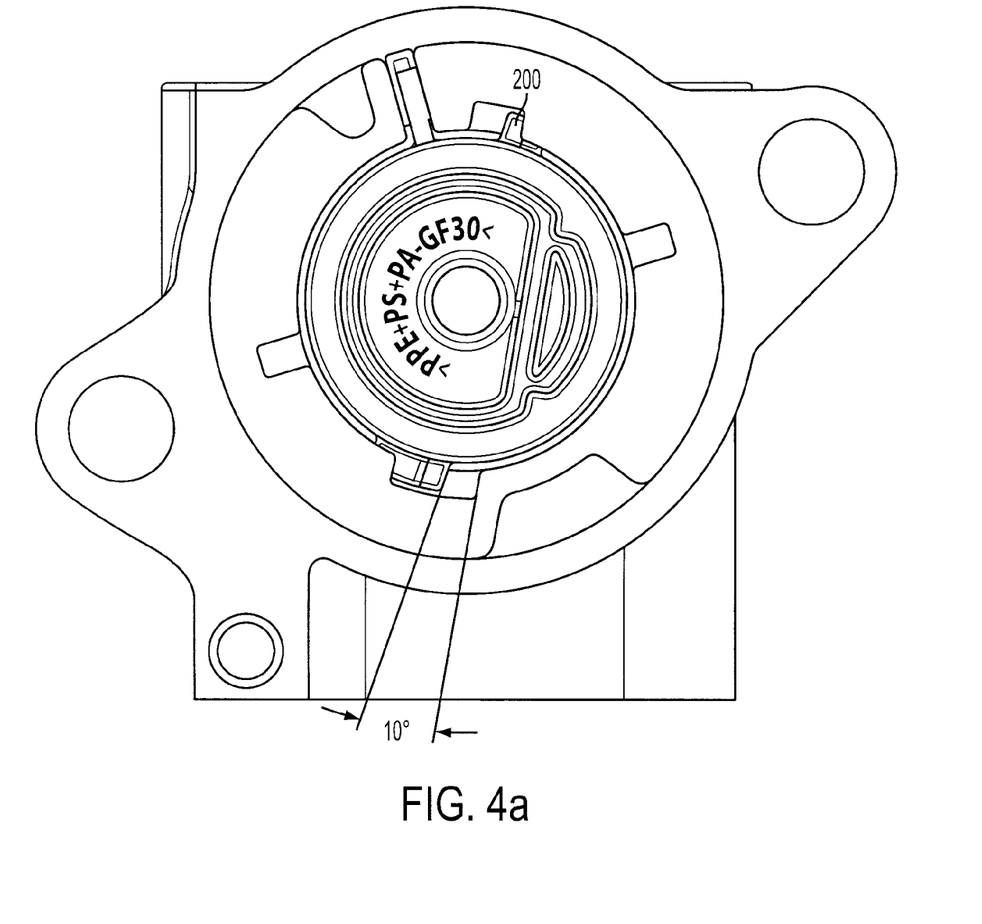
FIG. 4a is a top view of the exemplary sensor shown in FIG. 1 with the rotor ears captured by the housing after initial assembly and the rotor rotated by 10 degrees.
Figure 4B:
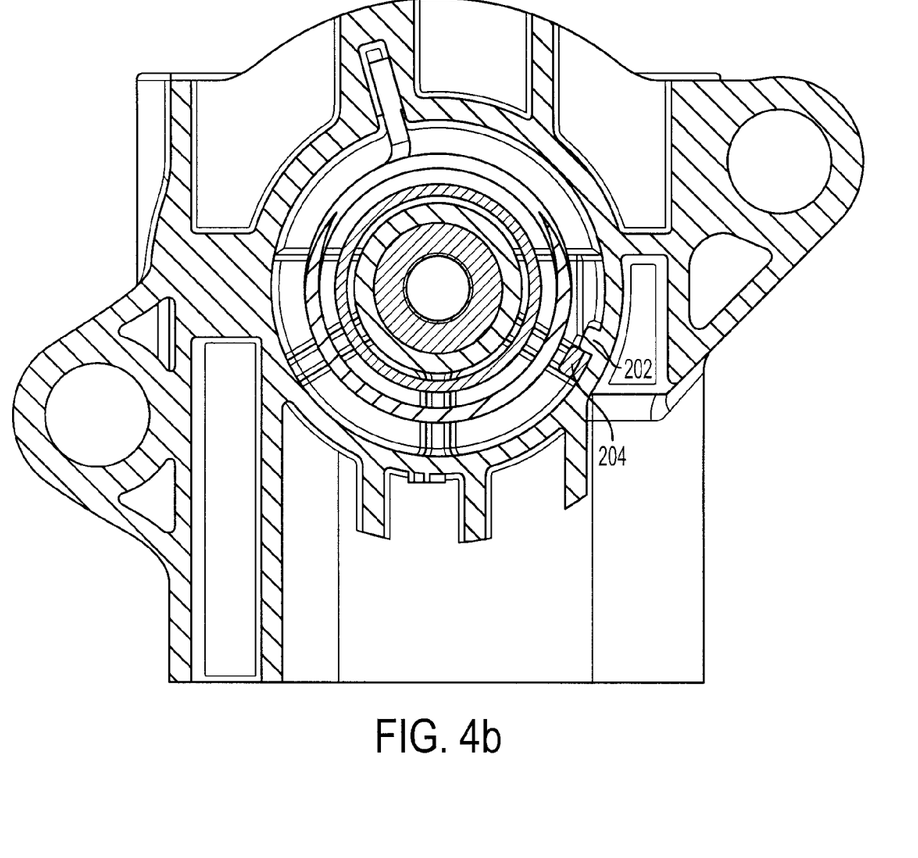
FIG. 4b is a sectional view of the assembly illustrated in FIG. 4a showing the housing stop preventing further rotation at 10 degrees.

FIG. 1 is an exploded view of an exemplary sensor 100 consistent with the invention. The illustrated exemplary embodiment includes a housing 102 for receiving a rotor assembly 104 having a magnet 106 disposed at an end 108 thereof. A return spring 110 is coupled to the housing around the rotor. A PCB assembly 112 is received within the housing, and a Hall device 114 is disposed on the PCB assembly to be in proximity with the end of the rotor 108 on which the magnet 106 is placed, as shown in FIG. 2. The PCB assembly may be secured to the housing by one or more fasteners, e.g. mounting screws 118. A cover 116 may be provided to close the opening for receiving the PCB to protect the Hall device and the electronics associated therewith from contaminants.

In operation, the rotor 104 may be coupled to the object to be sensed for rotation therewith. Rotation of the magnet 106 to a position adjacent the Hall device 114 on the PCB causes a change in the state or the linear output of the Hall device. The output of the Hall device may thus be directly related to the rotation position of the rotor and the object to be sensed. In one embodiment, the Hall device may be a programmable hall device. The Hall output may be used to determine the rotational position of the object to be sensed. A dual hall system may be provided.

Figure 5:
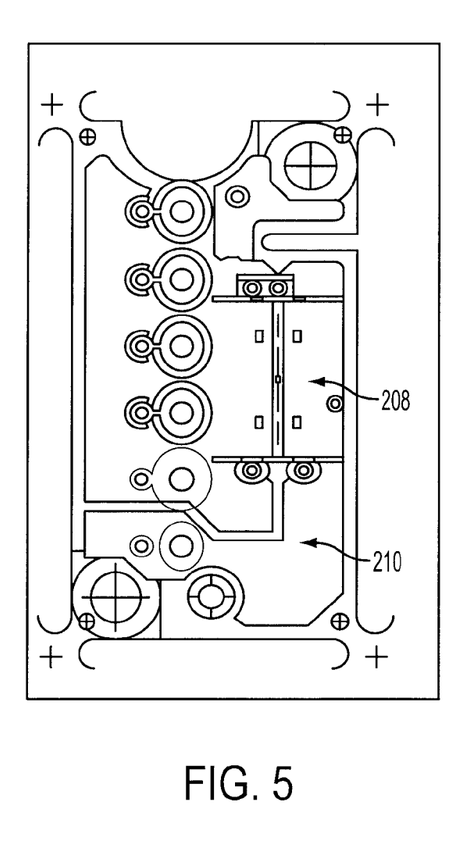
FIG. 5 is a top view of an exemplary PCB layout consistent with the present invention showing an exemplary ground plane and Hall IC.
Figure 6:
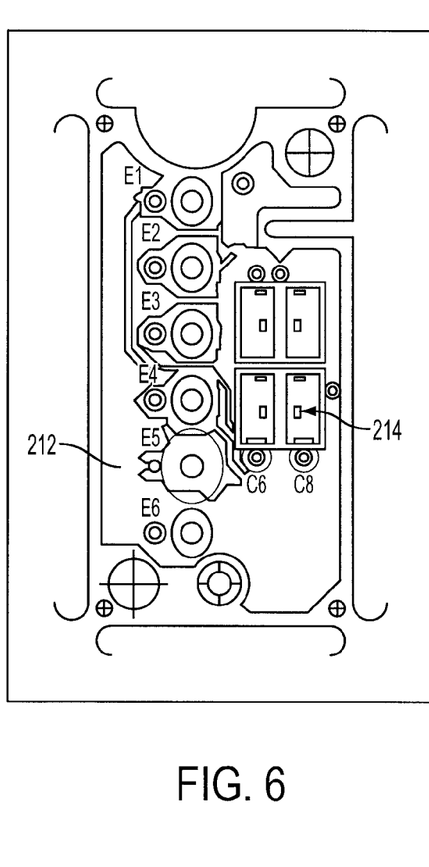
FIG. 6 is a bottom view of the PCB layout of FIG. 5 showing exemplary ground plane, terminals and capacitor positions.
Figure 7:
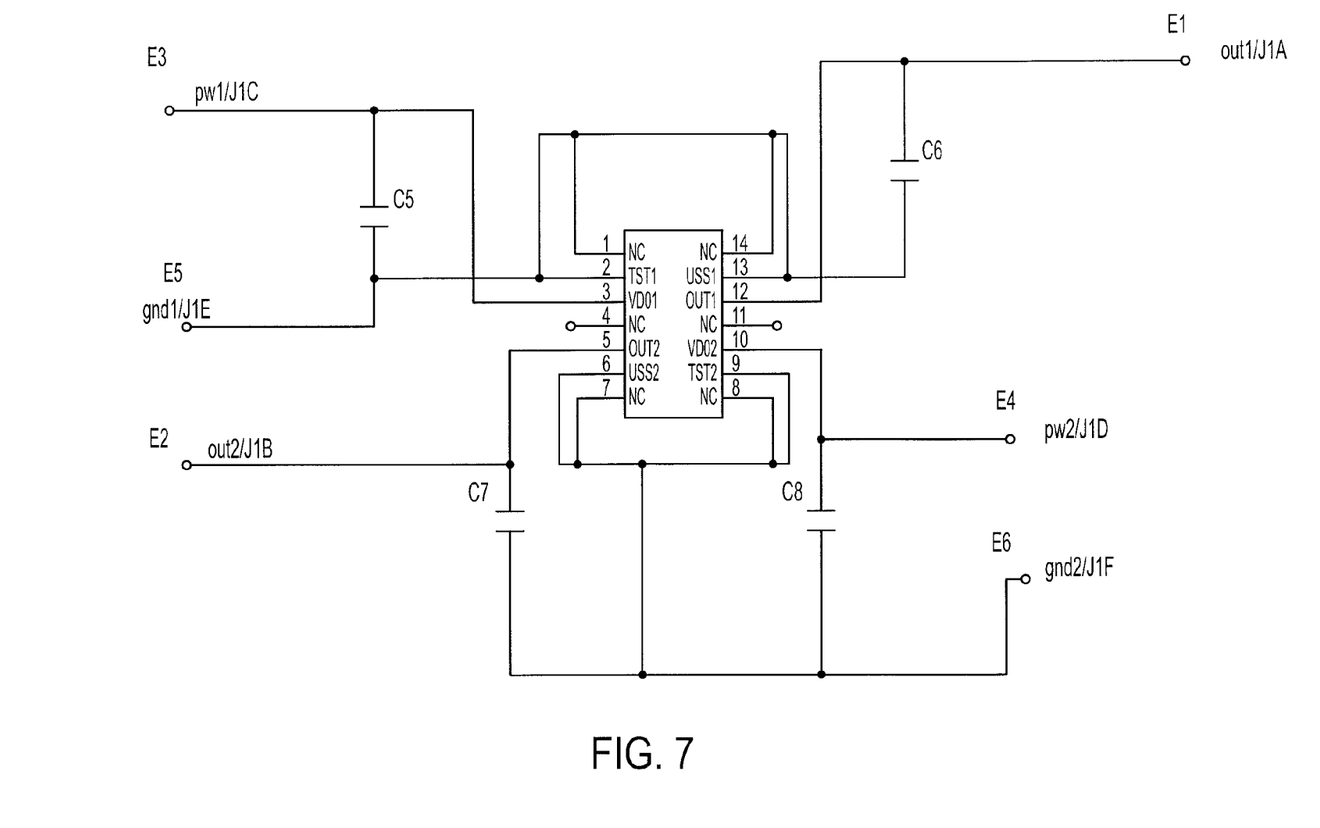
FIG. 7 is a detailed electronics layout of the components for a sensor consistent with the present invention.

A sensor consistent with the present invention may include one or more of several features or combinations thereof, including:

1. A surface mounted PCB assembly 112 with single package dual hall 208, e.g. Molexis MLX 90215IC or similar design. Dual hall provides redundant signal output and is more tolerant to dimensional variation and external fields.
2. Six terminal 212 design for power and signal output to EEU. Hall output programmable during component assembly and on vehicle.
3. Rectangular Samarium Cobalt Magnet positioned and aligned in rotor mold and insert molded. Other magnet materials may be used depending on system requirements.
4. Magnet may be magnetized in the rotor assembly, or prior to assembly, and then calibrated for a lower value for improved temperature performance.
5. The magnet may provide a +/−200 Gauss magnetic field to the hall device, providing robust signal output.
6. PCB ground plane 210 may be optimized for ESD protection. Trace size may be maximized and four capacitors 214 may be positioned directly over the Hall IC 208 (one each for the two circuit Power Inputs and the two Signal Outputs) for close proximity to the Hall IC.
7. Design may be configured to provide 3% full scale linearity up to 90 degrees of angular rotation.
8. Cover design may be molded plastic or formed metal for additional protection from external magnetic or electromagnetic fields.

9. Electronics may be potted with soft epoxy, silicone, or similar material to protect the device from environmental effects.
10. Lost motion shaft/rotor offset compensation may be provided.
11. Rotor tabs 200 may be aligned with slots 201 of the housing for assembly and pushed together. A molded-in housing stop 202 depresses the rotor wall tooth 204 during assembly, but when the rotor is rotated past the housing stop the tooth 204 may snap back into its free position and act as a rotational stop feature and prevents disassembly. A tool can be used for disassembly of the rotor during manufacture. The rotor tabs engage in the housing halo 206 when rotated for axial positioning between the rotor and the housing.
12. Dynamic Idle adjustment in EEU.

According to one aspect of the invention, there is thus provided a rotary magnetic position sensor including a housing, a sensor coupled to the housing, a rotor rotatably mounted to the housing, and a magnet coupled to the rotor and positioned adjacent the sensor. The sensor may be configured to provide a sensor output in response to a rotational position of the rotor relative to the housing.

The embodiments that have been described herein, however, are but some of the several which utilize this invention and are set forth here by way of illustration but not of limitation. Additionally, it will be appreciated that aspects of the various embodiments may be combined in other embodiments. It is obvious that many other embodiments, which will be readily apparent to those skilled in the art, may be made without departing materially from the spirit and scope of the invention as defined in the appended claims.

What is claimed is:

1. A rotary magnetic position sensor comprising:
    a housing;
    a sensor coupled to said housing;
    a rotor rotatably mounted to said housing;
    a return spring coupled to said housing and disposed around said rotor; and
    a magnet coupled to said rotor and positioned adjacent said sensor, said sensor being
    configured to provide a sensor output in response to a rotational position of said rotor relative to said housing, wherein said housing comprises a housing stop portion for engaging a tooth portion of said rotor, said housing stop being configured to engage and depress said tooth portion during assembly and allow said tooth portion to snap back to a free position upon rotation of said tooth portion past said housing stop, and said housing portion being configured engage said tooth portion after assembly to interrupt rotation of said rotor relative to said housing and prevent facile disassembly of the rotary magnetic position sensor, and wherein said housing comprises a plurality of slots and said rotor comprises a plurality of tabs, each of said tabs being dimensioned to be received within an associated one of said slots.

2. A sensor according to claim 1, wherein said sensor is disposed on a printed circuit board disposed at least partially in said housing.

3. A sensor according to claim 2, wherein said sensor comprises a Hall Effect sensor.

\* \* \* \* \*